(12) United States Patent
Lapira et al.

(10) Patent No.: US 8,924,162 B2
(45) Date of Patent: Dec. 30, 2014

(54) TURBINE-TO-TURBINE PROGNOSTICS TECHNIQUE FOR WIND FARMS

(71) Applicant: University of Cincinnati, Cincinnati, OH (US)

(72) Inventors: Edzel R. Lapira, Cincinnati, OH (US); Hassan Al-Atat, Mason, OH (US); Jay Lee, Mason, OH (US)

(73) Assignee: University of Cincinnati, Cincinnati, OH (US)

(*) Notice: Subject to any disclaimer, the term of this patent is extended or adjusted under 35 U.S.C. 154(b) by 0 days.

(21) Appl. No.: 13/674,200

(22) Filed: Nov. 12, 2012

(65) Prior Publication Data

US 2013/0073223 A1 Mar. 21, 2013

Related U.S. Application Data

(63) Continuation of application No. PCT/US2011/036402, filed on May 13, 2011.

(60) Provisional application No. 61/334,302, filed on May 13, 2010.

(51) Int. Cl.
| | | |
|---|---|---|
| *G01B 3/00* | (2006.01) | |
| *G01L 5/12* | (2006.01) | |
| *G01L 5/16* | (2006.01) | |
| *G01R 11/30* | (2006.01) | |
| *G06F 19/00* | (2011.01) | |
| *F03D 7/04* | (2006.01) | |
| *F03D 11/00* | (2006.01) | |

(52) U.S. Cl.
CPC ............... *G06F 19/00* (2013.01); *F03D 7/048* (2013.01); *F03D 11/0091* (2013.01); *G06F 2217/76* (2013.01); *F05B 2260/821* (2013.01); *F05B 2260/84* (2013.01); *F05B 2270/332* (2013.01); *Y02E 10/722* (2013.01); *Y02E 10/723* (2013.01)
USPC ..................... 702/34; 702/41; 702/60; 702/64

(58) Field of Classification Search
USPC ......... 702/34, 41, 60, 64, 136, 182, 183, 184, 702/188; 290/44; 416/40; 714/47.2
See application file for complete search history.

(56) References Cited

U.S. PATENT DOCUMENTS 6,800,956 B2 * 10/2004 Bartlett ........................... 290/55
7,075,189 B2 * 7/2006 Heronemus et al. ............ 290/44
(Continued)

FOREIGN PATENT DOCUMENTS

KR 100954090 B1 4/2010

OTHER PUBLICATIONS

International Search Report and Written Opinion for PCT/US2011/036402, mailed Dec. 27, 2011.

*Primary Examiner* — Eliseo Ramos Feliciano
*Assistant Examiner* — Felix Suarez
(74) *Attorney, Agent, or Firm* — Denise M. Everett

(57) ABSTRACT

Methods and systems for predicting an end of life of a wind turbine component including receiving environmental conditions indicative of natural surroundings of wind turbines within a wind turbine farm, receiving component performance metrics indicative of an operation of wind turbines within a wind turbine farm, and distributing the wind turbines into peer-clusters such that the wind turbines within each of the peer-clusters have similar environmental conditions. The methods and systems further include identifying a low performing wind turbine and a remaining portion of wind turbines within one of the peer-clusters based upon a predicted performance model, processing the component performance metrics of the low performing wind turbine, identifying a critical component of the low performing wind turbine and predicting the end of life of the critical component of the low performing wind turbine.

20 Claims, 8 Drawing Sheets

(56) References Cited

U.S. PATENT DOCUMENTS

| | | | |
|---|---|---|---|
| 7,308,614 B2* | 12/2007 | Kojori | 714/47.2 |
| 7,322,794 B2* | 1/2008 | LeMieux et al. | 416/40 |
| 7,528,496 B2* | 5/2009 | Fortmann | 290/44 |
| 7,832,980 B2* | 11/2010 | Demtroder et al. | 415/118 |
| 7,895,016 B2* | 2/2011 | Vittal et al. | 702/184 |
| 7,927,077 B2* | 4/2011 | Olson | 416/229 R |
| 8,021,112 B2* | 9/2011 | Dinjus et al. | 416/1 |
| 8,057,127 B2* | 11/2011 | Lopez et al. | 405/224 |
| 2007/0140847 A1 | 6/2007 | Martinez De Lizarduy Romo et al. | |
| 2008/0140349 A1 | 6/2008 | Behera et al. | |
| 2009/0257873 A1 | 10/2009 | Egedal et al. | |
| 2011/0142631 A1* | 6/2011 | Kawai et al. | 416/35 |
| 2012/0029839 A1* | 2/2012 | Ritter et al. | 702/34 |
| 2012/0101639 A1* | 4/2012 | Carralero et al. | 700/286 |
| 2012/0166142 A1* | 6/2012 | Maeda et al. | 702/185 |

* cited by examiner

TURBINE-TO-TURBINE PROGNOSTICS TECHNIQUE FOR WIND FARMS

CROSS REFERENCE TO RELATED APPLICATIONS

The present application is a continuation of International Application No. PCT/US2011/036402 filed May 13, 2011, which claims the benefit of U.S. Provisional Application Ser. No. 61/334,302, titled "Turbine-to-Turbine Prognostic Technique for Wind Farms" filed May 13, 2010.

TECHNICAL FIELD

The present disclosure is generally directed to systems for managing maintenance of wind turbine farms.

BACKGROUND

Wind turbines are used nearly continuously to generate energy by harnessing the wind. Often times, wind turbines are placed in remote locations and typically operate without intervention from local personnel. Additionally, because wind turbines are often subjected to varied and dynamic environmental conditions (e.g., varied wind speeds, temperature, moisture, etc.), the components of the wind turbines are subject to a high amount of wear, which may not be easily monitored.

To ensure the reliability of wind turbines in a wind turbine farm and, therefore, to maintain a high availability rate of the turbines and low operational and maintenance costs, predictive maintenance techniques that monitor and evaluate the performance of wind turbines may be used to forecast the health of the wind turbines themselves. However, variable such as geographic position and hardware modifications may prevent the direct comparison of wind turbines at a wind turbine farm. Accordingly, alternative systems for managing maintenance of wind turbine farms may be desired.

SUMMARY

In one embodiment, a method for predicting an end of life of a wind turbine component wherein a processor transforms electronic data into a prognostic evaluation including receiving environmental conditions indicative of natural surroundings of wind turbines within a wind turbine farm and receiving component performance metrics indicative of an operation of wind turbines within a wind turbine farm. The method further includes distributing the wind turbines into peer-clusters such that the wind turbines within each of the peer-clusters have similar environmental conditions, and identifying a low performing wind turbine and a remaining portion of wind turbines within one of the peer-clusters based upon a predicted performance model. The method further includes processing the component performance metrics of the low performing wind turbine and the remaining portion of wind turbines to extract fault condition indicators that correlate the component performance metrics to failure modes, identifying a critical component of the low performing wind turbine by contrasting the fault condition indicators of the low performing wind turbine with the remaining portion, and predicting the end of life of the critical component of the low performing wind turbine based upon the component performance metrics of the remaining portion of wind turbines.

In another embodiment, a system for predicting an end of life of a wind turbine component including a processor for executing machine readable instructions electronically coupled to an electronic memory for storing the machine readable instructions, a wind turbine farm comprising wind turbines for generating energy from wind, environmental sensors located proximate to each of the wind turbines for detecting environmental conditions surrounding the wind turbines, and performance sensors located proximate to each of the wind turbines for detecting performance metrics correlated with the wind turbines. The processor is supplied with data from the environmental sensors and the performance sensors and executes the machine readable instructions to distribute the wind turbines into peer-clusters according to similarities in the environmental conditions and distinguish a low performing wind turbine from a remaining portion of the wind turbines within one of the peer-clusters based upon the performance metrics.

In yet another embodiment, a wind turbine farm that predicts an end of life of a wind turbine component includes a plurality of wind turbines, each wind turbine comprising a generator coupled to a blade by a gearbox for generating energy from wind, environmental sensors located proximate to each of the wind turbines for detecting environmental conditions surrounding the wind turbines, and performance sensors located proximate to each of the wind turbines for detecting performance metrics correlated with the wind turbines. The wind turbine farm further includes gearbox sensors located proximate to each of the gearboxes for detecting gearbox performance metrics correlated with the wind turbines and a processor for executing machine readable instructions. The processor is supplied with data from the environmental sensors, the performance sensors, and the gearbox sensors and executes the machine readable instructions to distribute the wind turbines into peer-clusters according to similarities in the environmental conditions, distinguish a low performing wind turbine from a remaining portion of the wind turbines within one of the peer-clusters based upon the performance metrics, and predict an end of life of the gearbox from the low performing wind turbine according to differences in the gearbox performance metrics.

BRIEF DESCRIPTION OF THE DRAWINGS

The following detailed description of specific embodiments of the present disclosure can be best understood when read in conjunction with the drawings enclosed herewith.

Figure 1:
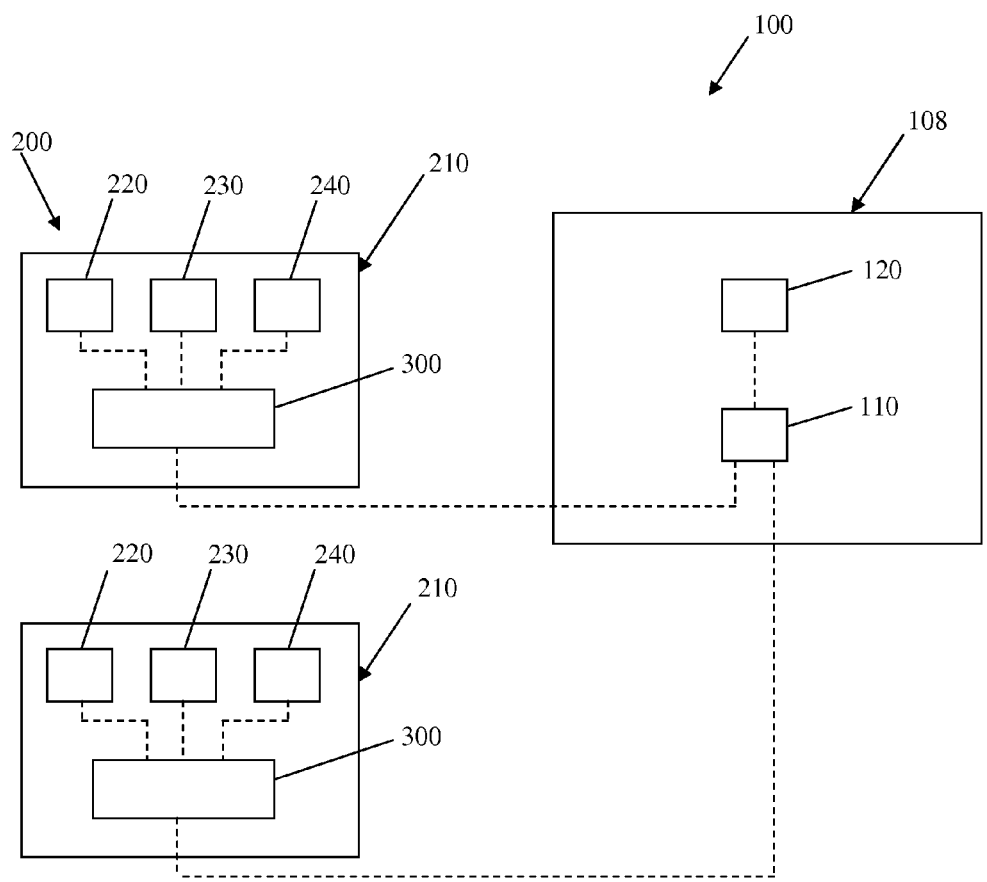
FIG. 1 depicts a schematic representation of a wind turbine farm according to one or more embodiments shown and described herein.

The embodiments set forth in the drawings are illustrative in nature and not intended to be limiting of the disclosure defined by the claims. Moreover, individual features of the drawings and disclosure will be more fully apparent and understood in view of the detailed description.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible, and it will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims.

Embodiments of the present disclosure are directed to methods and systems for predicting an end of life of a wind turbine component. The methods analyze data provided by sensors located at the wind turbines or which sense data indicative of wind turbines. Raw input data from the sensors may be introduced to a supervisory control and data acquisition (SCADA) of a wind turbine. The SCADA then may output the sensor data for external monitoring. The wind turbines may be arranged into peer-clusters based on the environmental conditions in which each of the wind turbines are operating. The low performing wind turbines within the peer-clusters are identified, and sensors monitoring the components of the wind turbines are analyzed to identify the critical components to which poor performance can be attributed. An estimation of expected life of the critical components may be made based on a physics-based model of an individual wind turbine. The methods of the present disclosure allow for the identification of critical components that are operating below optimal performance and a prediction of the end of life of those critical components, while not requiring development of a physics-based model to evaluate the entirety of the wind turbine farm.

One embodiment of a system 100 for predicting the end of life of a wind turbine component is depicted in FIG. 1. The system 100 may include an electronic control unit 108 that monitors and/or controls operation of at least one wind turbine 210 arranged in a wind turbine farm 200. The electronic control unit 108 comprises a processor 110 for executing machine readable instructions and is electrically coupled to an electronic memory 120 for storing machine readable instructions. The electronic control unit 108 is in electrical communication with the processor 110 and the electronic memory 120. The processor 110 may be an integrated circuit, a microchip, a computer, or any other computing device capable of executing machine readable instructions. The electronic memory 120 may be RAM, ROM, a flash memory, a hard drive, or any device capable of storing machine readable instructions. In the embodiments described herein, the processor 110 and the electronic memory 120 may be integral with the electronic control unit 108. However, it is noted that the electronic control unit 108, the processor 110, and the electronic memory 120 may be discrete components in electrical communication with one another without departing from the scope of the present disclosure. As used herein, the phrase "in electrical communication" means that the components are capable of transmitting electrical or electromagnetic signals with one another via a conductive medium such as for example, terminal blocks, posts, solder joints, integrated circuit traces, wires, and the like.

The processor 110 and/or the electronic memory 120 may be electronically coupled to a plurality of sensors originating from wind turbines 210. Each of the wind turbines 210 are provided with environmental sensors 220, performance sensors 230, and component sensors 240 arranged along the wind turbines 210 or in close proximity to the wind turbines 210. The environmental sensors 220, the performance sensors 230, and the component sensors 240 are generally used in regular operation of the wind turbines 210, and input signals to a SCADA 300. The SCADA 300 monitors and controls the wind turbines 210 during operation. The SCADA 300 may include control logic that allows the SCADA 300 to adjust the wind turbine 210 to manage power generation of the wind turbines 210 at various environmental conditions. In an alternative or in addition, data may be collected by the SCADA 300 and sent to an offline computer or a networked computer for processing according to the techniques described in the present disclosure.

Figure 2:
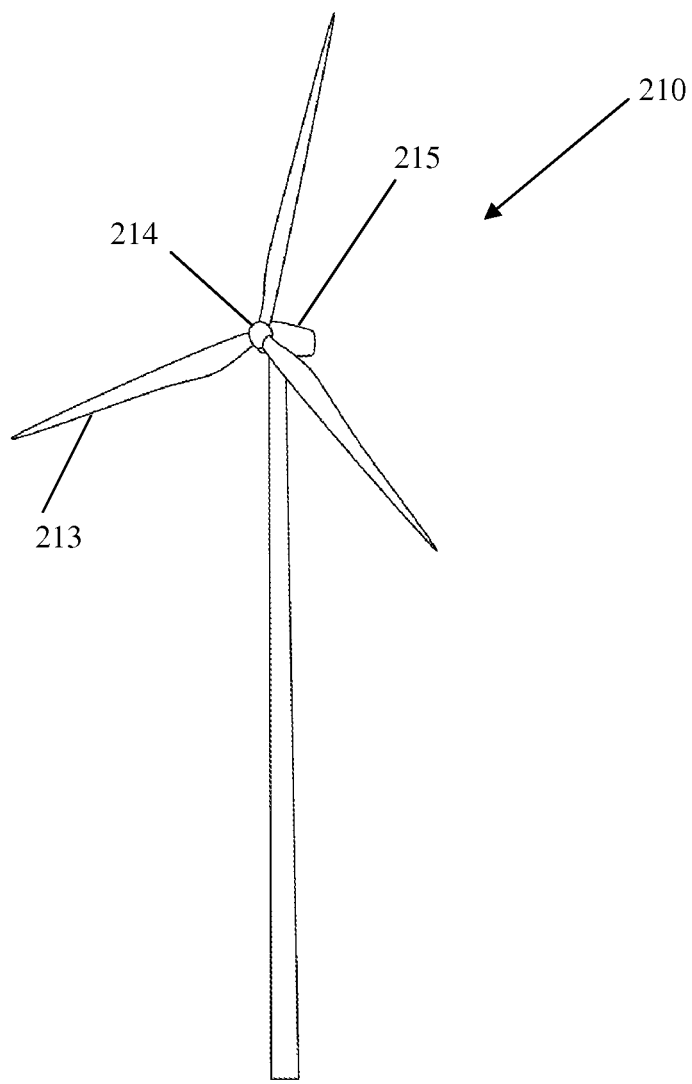
FIG. 2 depicts a schematic representation of a wind turbine according to one or more embodiments shown and described herein.

As depicted in FIG. 2, the wind turbines 210 themselves may generally include a plurality of blades 213 having an airfoil shape. In one embodiment, the blades 213 are mounted within a hub 214, which rotates about a nacelle 215. The nacelle 215 may rotate to position the blades 213 such that the blades 213 face towards the direction of wind (i.e., yaw the position of the blades 213). Additionally, the blades 213 may include a feathering mechanism that changes the angle of pitch of the blades 213 relative to the direction of wind. The pitch of the blades 213 may be controlled to maximize power extraction by the blades 213 from the wind. Additionally, the pitch of the blades 213 may be moved away from an angle that maximizes power extraction in cases of high wind speeds to protect the various components of the wind turbine 210. Orientation of the nacelle 215 and the pitch of the blades 213 may be controlled by the SCADA 300.

Figure 3:
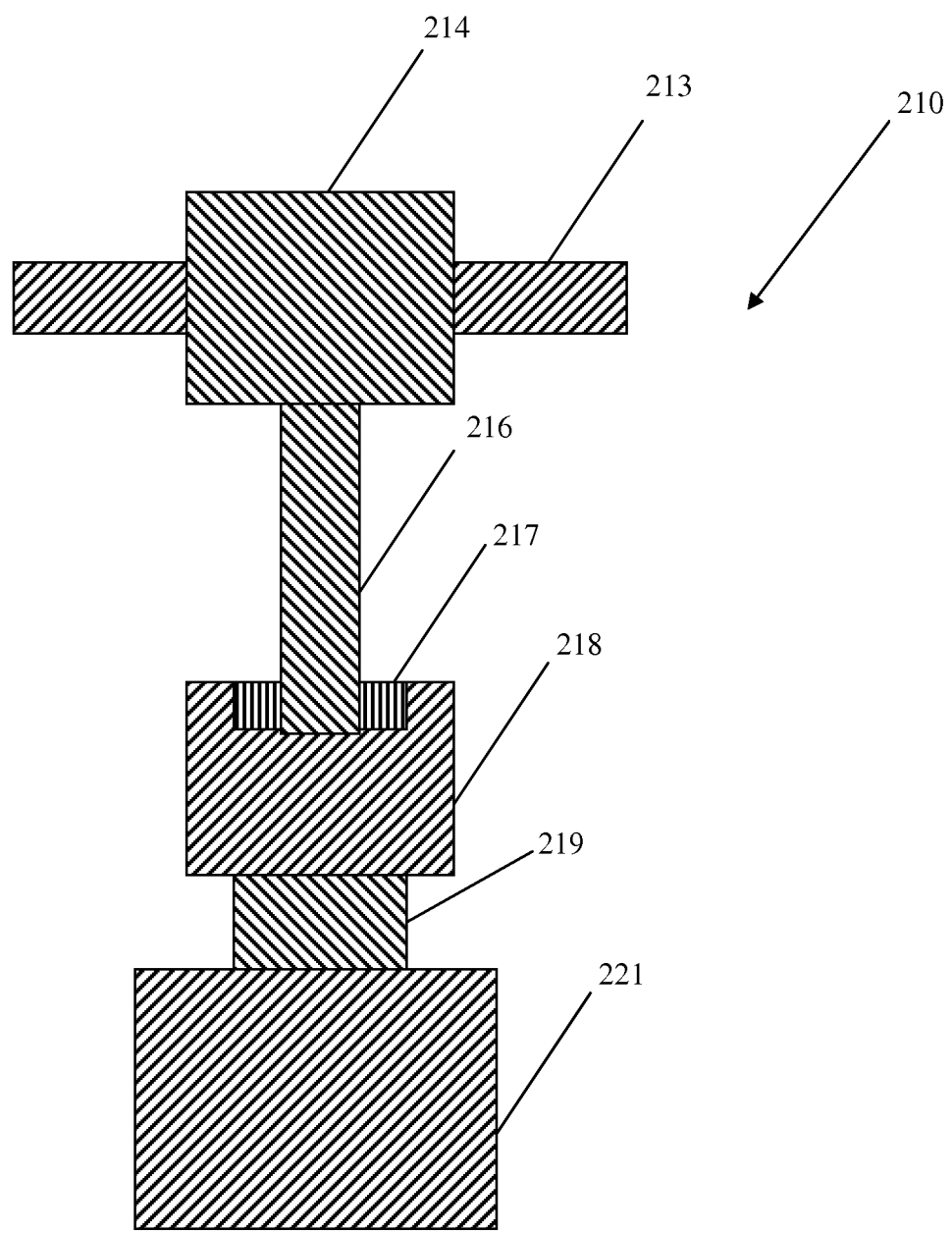
FIG. 3 depicts a schematic cross-sectional representation of a wind turbine according to one or more embodiments shown and described herein.

As schematically depicted in FIG. 3, the blades 213 and the hub 214 is coupled to a generator 221, located within the nacelle 215. The generator 221 includes a rotor element and a stator element (not shown). Rotation of the rotor element within the stator element of the generator 221 creates electrical energy. The hub 214 may be coupled to the generator 221 through a gearbox 218. The gearbox 218 may include a gear set that has gears with mating gear teeth. The gear set may increase the speed of rotation of the rotor element within the stator element, as compared to the speed of rotation of the blades 213 and the hub 214. The gearbox 218 may be coupled to the generator 221 through an intermediate shaft 219. The intermediate shaft transfers torque from the gearbox 218 to the generator 221, and may include torque transferring features, for example, a splined interface or a key and keyway interface.

The hub 214, and therefore the blades 213, may extend away from the generator 221 and/or the gearbox 218 along a shaft 216. The shaft 216 be supported by one or more bearings 217 that allow rotation of the hub 214 and the generator 221 rotor element about the generator stator element, and/or maintain spacing of the rotor element and the stator element. The bearing 217 may be a rolling element bearing having an inner race, an outer race, and a plurality of rolling elements, for example balls, cylindrical rollers, tapered rollers, or spherical rollers, which are inserted between the inner race and the outer race.

The environmental sensors 220 may measure characteristics of the environment surrounding the wind turbines 210, including, but not limited to, wind speed, wind direction, ambient temperature, barometric pressure, humidity, or a combination thereof. The performance sensors 230 may include sensors that measure the electrical power generated by the wind turbines 210. The component sensors 240 may measure status of the components of the wind turbines 210, and may include, but are not limited to, blade pitch measurement, blade yaw measurement, accelerometers, tachometers, thermocouples, oil pressure sensors, oil temperature sensors, or oil degradation sensor. Component sensors 240 that measure status of the components of the gearbox 218 may be classified as gearbox sensors.

Figure 4:
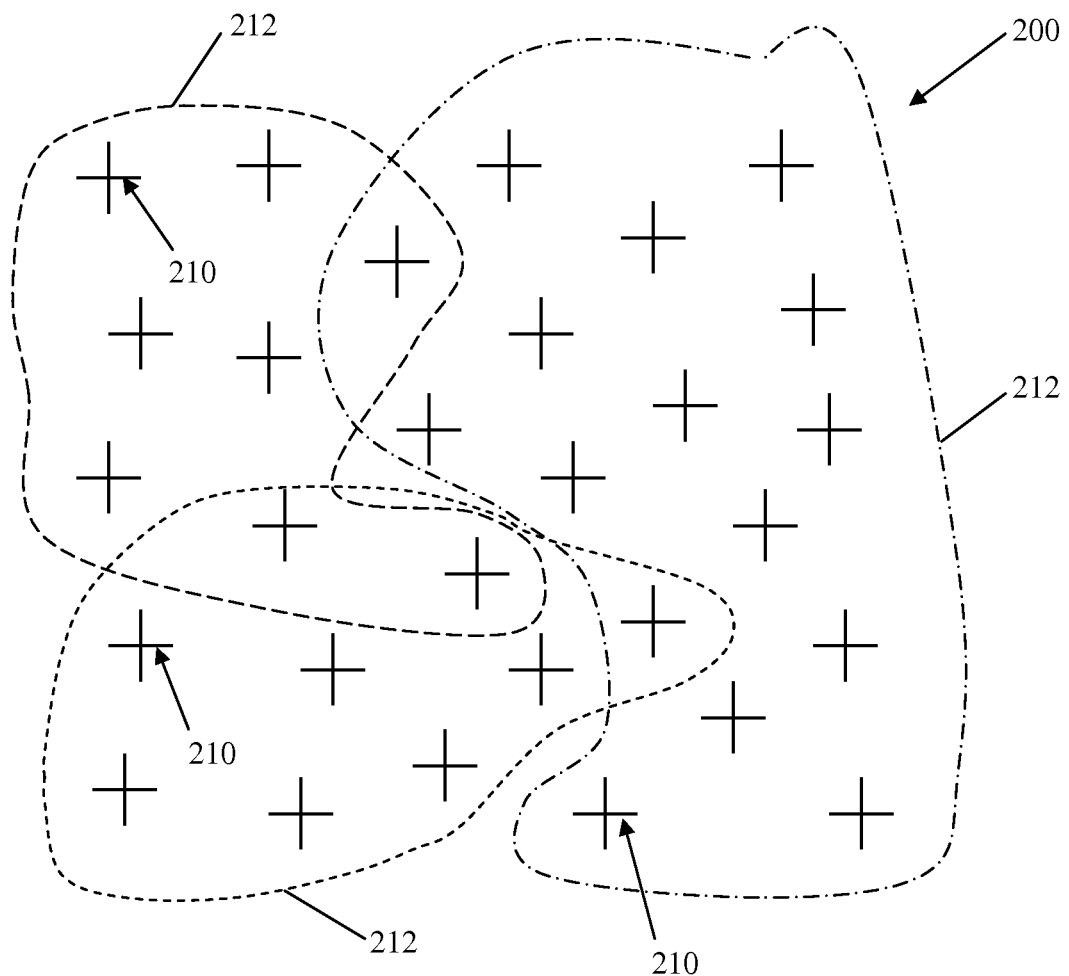
FIG. 4 depicts a schematic representation of a wind turbine farm according to one or more embodiments shown and described herein.
Figure 5:
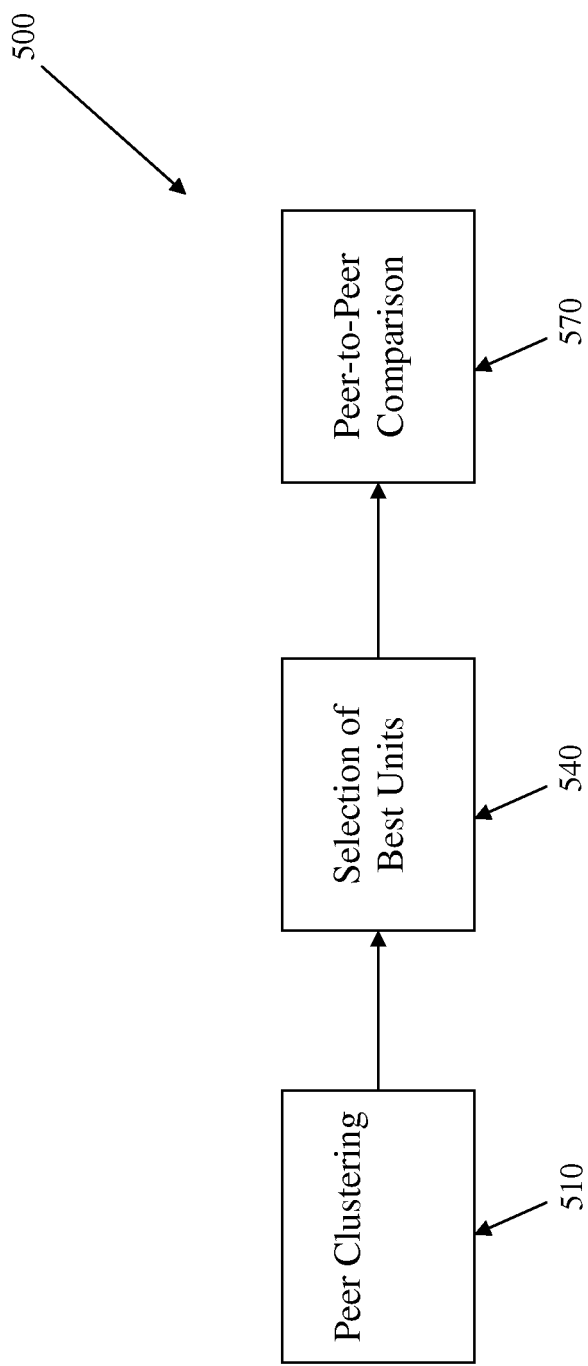
FIG. 5 depicts a schematic representation of a method for evaluating wind turbine performance according to one or more embodiments shown and described herein.
Figure 6:
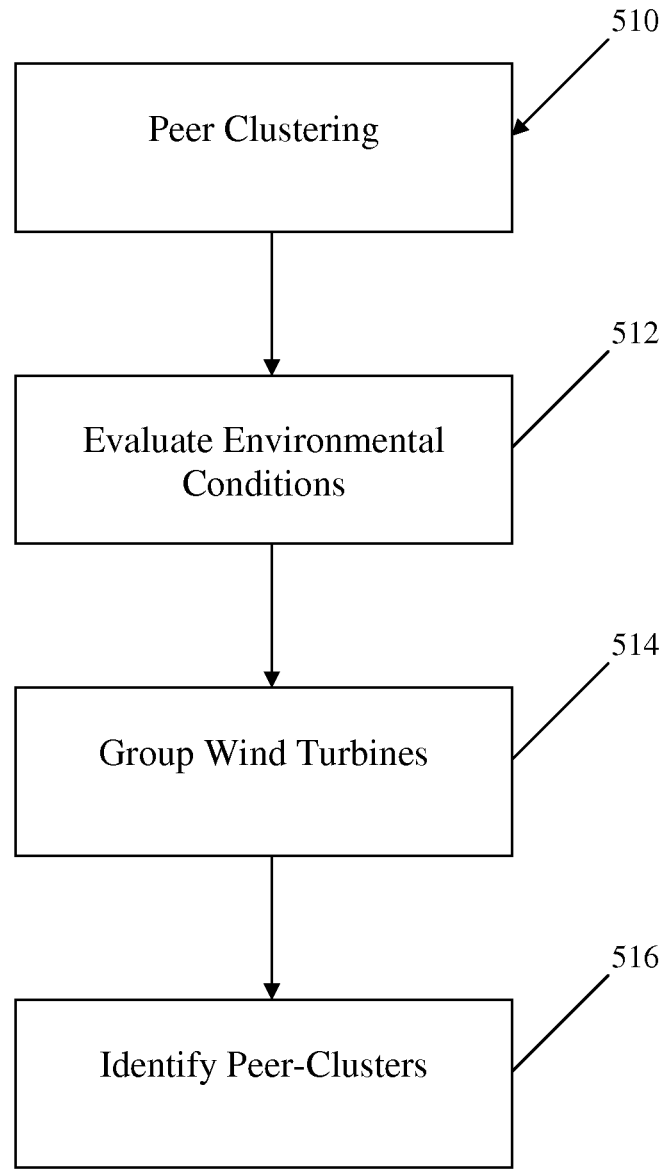
FIG. 6 depicts a schematic representation of the method for evaluating wind turbine performance according to FIG. 5.
Figure 7:
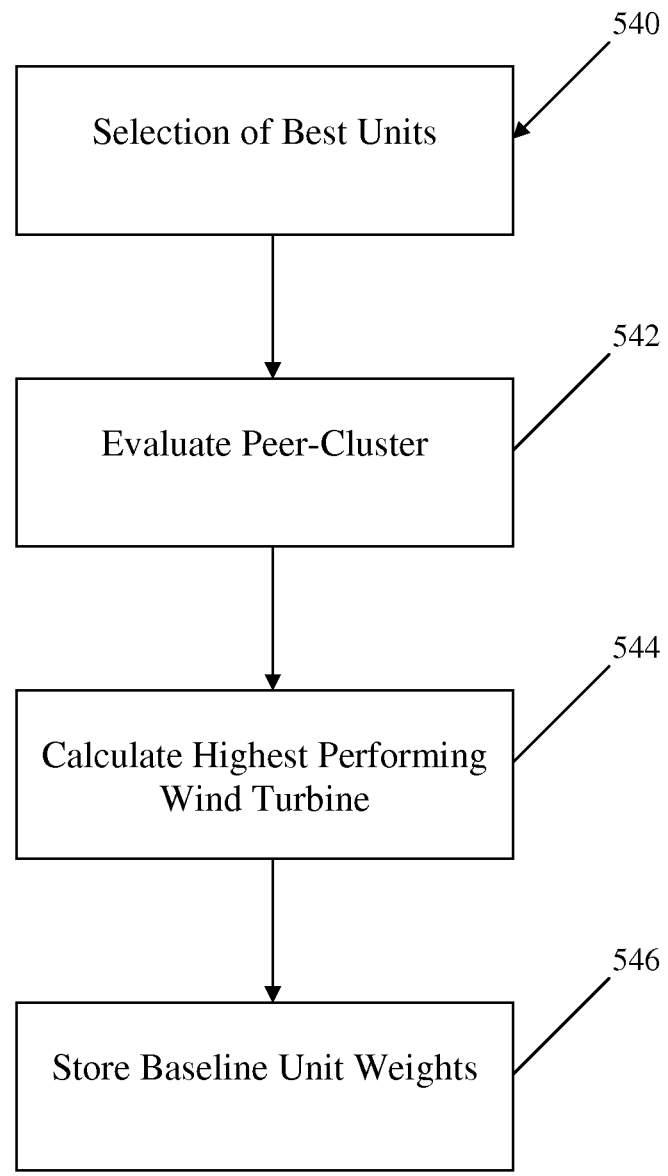
FIG. 7 depicts a schematic representation of the method for evaluating wind turbine performance according to FIG. 5.
Figure 8:
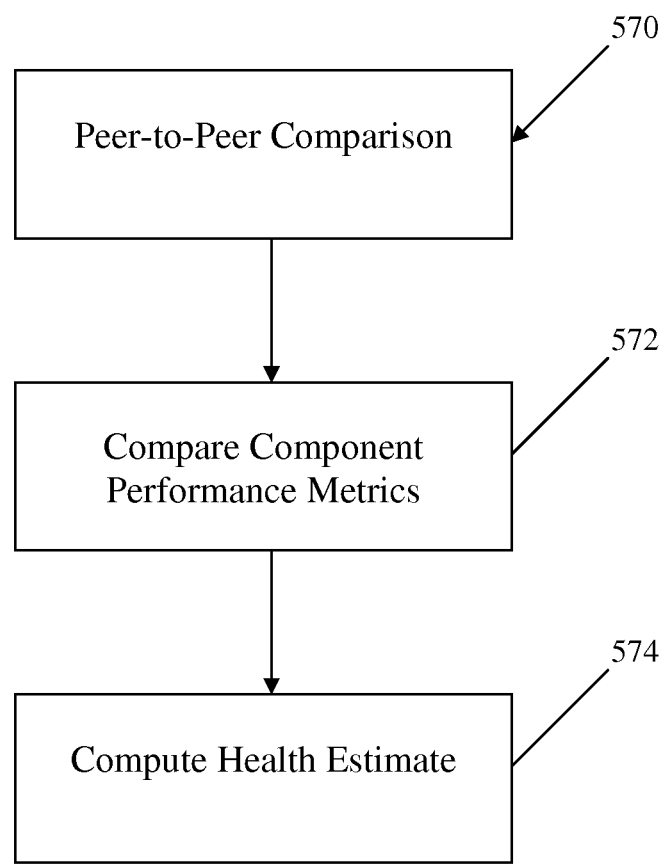
FIG. 8 depicts a schematic representation of the method for evaluating wind turbine performance according to FIG. 5.

As depicted in FIG. 4, a plurality of wind turbines 210 may be arranged in geographic proximity to one another to form a wind turbine farm 200. By localizing a plurality of wind turbines 210 in one location, costs associated with infrastructure and maintenance may be controlled.

The maximum power performance of a wind turbine 210 may be calculated using a procedure described in the International Electrotechnical Commission Standard 61400-12. Energy generation of the wind turbine 210 is measured across a series of wind speed bins. The realistic power expectation may be calculated using by evaluating the following formula:

$$P_{expected} = \frac{1}{2}\pi R^2 \rho v^2 C_p$$

where R is the rotor radius of the wind turbine 210, ρ is the air density, V is the wind speed, and $C_p$ is the power coefficient, which is determined experimentally for each of the series of wind speed bins. The power generated by a wind turbine 210 may therefore be compared with the realistic power expectation formula to determine if the wind turbine 210 is performing according to the expectation, or if the wind turbine 210 is performing below expectation. However, the power coefficient, and therefore the realistic power expectation, may vary due to a variety of causes, including age, condition, and manufacturing variations of the hardware components of the wind turbines 210. Therefore, accurate calculation of the realistic power expectation for any one wind turbine 210 may require direct measurement of the power coefficient, which may be impractical or cost prohibitive, particularly for wind turbines 210 that are currently operated in the field.

Further, it may not be practical to compare wind turbines 210 that are operating at different environmental conditions. For example, a wind turbine 210 located in a higher-velocity wind stream may have a higher rate of rotation than a wind turbine 210 located in a lower-velocity wind stream. As such, the wind turbine 210 located in a higher-velocity wind stream may have higher oil temperatures, higher slip ring temperatures, and larger vibration as measured at the bearings 217 and the gearbox 218, if any. Additionally, if a wind turbine 210 operates at a rotational speed that corresponds with one of the natural frequencies of one of the components of the wind turbine 210, the vibration as measured at the bearings 217 and the gearbox 218, if any, may be larger than the vibration if the same wind turbine 210 were operated at a speed other than a speed corresponding to one of the natural frequencies of one of the components of the wind turbine 210. Thus, direct comparison between two wind turbines 210 operating in different environmental conditions may not provide the desired results.

Steps in the analysis of wind turbines 210 according to the methods and systems of the present disclosure are depicted in FIGS. 5-8. First, the wind turbines 210 may be distributed into peer-clusters 212 in the steps of peer clustering 510. Referring again to FIGS. 1 and 4, the system 100 of the present disclosure processes input data from the SCADA 300 of the wind turbines 210 to first distribute the wind turbines 210 into peer-clusters 212, such that the wind turbines 210 within each of the peer-clusters 212 have similar environmental conditions. The peer-clusters 212 may include wind turbines 210 that are arranged geographically independent from one another. Further, as depicted in FIG. 4, the peer-clusters 212 may overlap one another, as the environmental conditions that some wind turbines 210 experience may fall within one or more peer-cluster 212.

Referring again to FIGS. 5-8, to distribute the wind turbines 210 into peer-clusters 212, the environmental conditions surrounding the wind turbines 210 are measured in the step evaluating environmental conditions 512. Environmental conditions evaluated may include, but are not limited to, wind speed, wind direction, temperature, barometric pressure, humidity, or a combination thereof. The wind turbines 210 are distributed into peer-clusters 212 in the step of group wind turbines 514 based on similar data provided by the environmental sensors 220. Each of the wind turbines 210 within a given peer-cluster 212 are denoted for later analysis in the step identifying peer-clusters 516

With the wind turbines 210 distributed into peer-clusters 212, the performance of each of the wind turbines 210 within each peer-cluster 212 may be processed through a performance assessment through steps of selection of the best unit 540, i.e., identifying the best performing wind turbine 210 in any peer-cluster 212. The power output and wind speed (e.g., when measured along a power curve) of the wind turbines 210 within the peer-cluster 212 may be collected and compared in the step of evaluate peer-clusters 542. The wind turbine 210 having the highest performance value within the peer-cluster 212 (as identified in the step of calculate highest performing wind turbine 544) is selected as the baseline wind turbine 210, to which other wind turbines 210 within the peer-cluster 212 may be compared. The wind turbines 210 having the low performance values within the peer-cluster 212 (e.g., the lowest performing wind turbine 210 or a selection of low performing wind turbines 210) may be identified as low performing wind turbines 210, and may be targeted for maintenance. Data from the component sensors 240 of the highest performing wind turbine 210 within the peer-cluster 212 may be placed into electronic memory 120 of the electronic control unit 108 in a step of storing baseline unit weights 546. This data from the component sensors 240 may be compared to other wind turbines 210 within the peer-cluster 212.

Each wind turbine 210 within the peer-cluster 212 may be assigned a performance value that corresponds to a predicted performance model for the wind turbines 210. The performance value of the wind turbine 210 may be a comparison of the actual power generated by the wind turbine 210 to a realistic power expectation calculated using the realistic power expectation formula using the actual environmental data and a generic power coefficient. Thus, the signals output from the performance sensors 230 of the wind turbines 210 may be used to calculate a component performance metric.

In order to determine which of the components of the wind turbines 210 may need to be replaced or repaired in a subsequent maintenance operation, wind turbines 210 are compared to their peer-cluster 212 in the steps of peer-to-peer comparison 570. In the step of compare wind turbine component performance metrics 572, component performance metrics may be assigned to the components of the low performing wind turbines 210 based on data gathered from the component sensors 240. These component performance metrics may compare the data gathered from the component sensors 240 of the low performing wind turbines 210 to the data gathered from the component sensors 240 of the highest performing wind turbine 210 within the peer-cluster 212. Further, the comparison of the component performance metrics may allow the step of compute health estimate 574, which may provide an analytical tool to monitor and evaluate the energy generation performance of each of the wind turbines 210, and calculate a probability of defect of a component.

The steps of peer-to-peer comparison 570 may allow for the implementation of an analytical tool that assists with scheduling of maintenance procedures. In current wind turbine farm 200 implementations, wind turbines 210 that require repair may be taken off line from generating power for an extended period of time, as the costs of performing the required repairs may exceed the revenue that may be generated had the wind turbine 210 been operating. As wind turbine farms 200 are located in further remote areas, this may become increasingly common. Accordingly, the systems and methods of the current disclosure may include an algorithm that assists an operator with making a decision whether to initiate a repair and incur the associated costs, or if waiting to perform a repair operation would be more cost effective. Such an algorithm may predict a cost of not performing the maintenance procedure (i.e., lost revenue) and compare it with a predicted cost of performing the maintenance procedure. Additionally, if the operator of a wind turbine farm 200 elects to perform the maintenance procedure, the systems and methods of the current disclosure may be used to assist the operator with identifying wind turbines 210 that are likely to need maintenance in the future. Performing maintenance operations on multiple wind turbines 210 within a wind turbine farm 200 at the same time may reduce the overhead costs of operating the wind turbine farm 200.

Data from the environmental sensors 220, the performance sensors 230, and the component sensors 240 may be processed by the electronic control unit 108 using a variety of commonly available methods. The signals from the sensors may be processed using a time domain analysis, a frequency domain analysis, a time-frequency analysis, a wavelet/wavelet packet analysis, a principal component analysis, and the like. The signals obtained from the sensors may be processed to form a performance prediction, a health assessment model, and a health diagnosis.

A performance prediction may assign a value to each individual wind turbine 210 that represents the power generating capacity of the wind turbine 210 to the highest performing wind turbine 210. A performance prediction analysis may be conducted using, for example, an autoregressive moving average, an Elman recurrent neural network, fuzzy logic, a match matrix, and the like. A health assessment may assign a value to components of the wind turbine 210 that are measured by the component sensors 240. A low value assigned in the health assessment may indicate maintenance is due. A health assessment may be conducted using, for example, logistic regression, statistical pattern recognition, feature map pattern matching (for example, Self-Organizing map), a neural network, a Gaussian Mixture Model, and the like. A health diagnosis may evaluate the data provided by the component sensors 240 of a low performing wind turbine 210 to establish which of the components within the wind turbine 210 are responsible for the poor performance. A health diagnosis may be conducted using, for example, a support vector machine, a feature map pattern matching (for example, Self-Organized Maps), a Bayesian Belief Network (BBN), a Hidden Markov Model (HMM), and the like. Some or all of these analysis models may be commercially available, for example, in MATHWORKS MATLAB® and associated Toolkits, or by any other analysis software.

Examples of analysis models that may be used to process the performance assessment as discussed above, including the use of a Self-Organizing Map (SOM), a Gaussian Mixture Model (GMM), or a Neural Network, will now be discussed in greater detail below. A SOM is a variant of a neural network technique, which are used to model complex relationships between inputs and outputs. Generally, neurons within the network represent known data points of known inputs and outputs. When a new data point becomes available, the new data point is placed "proximate" to the nearest neurons. Preexisting nodes in the neural network may provide an estimation of the predicted output of a system based on a given input.

The term "self-organizing" refers to the ability of the SOM to learn and organize information without being giving the corresponding class labels. SOM learns the nature of the input training data and organizes the neurons with similar feature values next to each other on the map. When an SOM structure is trained using baseline data, a best matching unit (BMU) is located in the map when a new input is presented. The distance between the new input and the BMU may be used to assess the performance of the wind turbine 210. A large distance value means that the new input is highly dissimilar from the trained baseline; a small distance value indicates the new input is close or similar to the baseline.

An input vector x of n dimension is defined as:

$$x=[x_1,x_2,\ldots,x_n]^T$$

Each neuron i in the SOM having m total neurons, has a weight vector denoted by:

$$\omega_i=[\omega_{i1},\omega_{i2},\ldots,\omega_{in}]^T, i=1,2,\ldots,m$$

The BMU is the neuron whose weight vector has the smallest distance measure from the input vector. The simplest distance measure is the Euclidean distance. Hence, the square root of the inner product of $x^T\omega_i$ can be used to measure the distance between x and $\omega_i$. The BMU of the input vector can be denoted as $\omega_C$, which meets the following criterion:

$$\|x-\omega_C\|=\min\{\|x-\omega_i\|\}_i \text{ for all } i=1,2,\ldots,m$$

where $\|\cdot\|$ is the operator for calculating the distance between the input vector and the neuron. At each step of the SOM training process, the weights of the BMU or neurons in a predefined scope around the input vector are updated by the following equation:

$$\omega_i(t+1)=\omega_i(t)+\alpha(t)h_{i,\omega_C}(t)(x-\omega_i(t))$$

where $\omega_i$ is the weight and t is the iteration step. $\alpha(t)$ is called the learning rate, which is similar to other neural networks. The learning rate starts at a large value at the initialization phase of the training and can be modified linearly, exponentially, or inversely proportionally to t. $h_{i,\omega_C}$ is a predefined neighborhood function. Simply, if the distance of the neuron weight is within a range of the neighborhood function, the value of $h_{i,\omega_C}$ is 1, which means that the weight of the neuron is to be updated. Otherwise, if the distance of the neuron weight is outside of the range of the neighborhood function, the value of $h_{i,\omega_C}$ is 0, which means that the weight of the neuron is not to be updated. In practice, a typical choice of the neighborhood function is a Gaussian function. The weight updating process is repeatedly carried out if a preset stop criterion, for example, a maximum number of iteration steps and threshold of the change of network error, is met.

As discussed above, the distance between the input vector and the weight of the BMU in a trained SOM structure may be used as a performance indicator to quantitatively measure the degradation status. The distance between the input vector and the weight of the BMU is defined as minimum quantization error (MQE):

$$MQE=\|x-\omega_{BMU}\|$$

where x is the input vector and $\omega_{BMU}$ is the weight vector of BMU. Data collected in normal operating conditions of the wind turbine 210 may be used to train a SOM structure as a baseline. Data obtained later can be used as input to the trained SOM structure. With all of the MQE values, the deviation of the input vector from the baseline may be evaluated and used as the performance indicator. If the input vector is close to the baseline, the MQE value is small. Otherwise, a large MQE value indicates a large deviation from the baseline, which may mean a degradation or abnormal situation has happened. Using this method, the multi-dimensional feature space is converted to a distance measure value (MQE) indicating the degradation status.

Another model, a Gaussian Mixture Model (GMM) may be used to evaluate the performance of wind turbines 210 in a wind farm. GMM is a probabilistic method that is often used for clustering and density estimation purposes. As the wind turbine features are not normally distributed, traditional distance metrics may not be appropriate for use. GMM can be used to decompose a non-Gaussian feature set into a combination of normal functions.

Using the feature set described above in reference to the SOM method, a mixture model, H(x), with n components may be mathematically described as:

$$H(x) = \sum_{i=1}^{n} p_i N(\mu_i, \delta_i)$$

where $p_i$ is the weight of the ith mixture and $N(\mu_i, \delta_i)$ corresponds to associated Gaussian distribution with mean vector $\mu_i$ and covariance matrix $\delta_i$.

One method to estimate the parameters of a GMM is the expectation maximization (EM) algorithm. Determining the GMM starts with clustering; the k-mean method may be utilized to determine the center of each GMM component. The clusters, which are candidate mixtures, are then solved with their mixture weights, $p_i$, and the distribution parameters $(\mu_i, \delta_i)$ using the EM technique.

The EM algorithm is a two-step approach: expectation and maximization. In the expectation step, initial guesses for the parameters are made and then the "partial membership" of each data point in each of the clusters is calculated. In the maximization step, the component weight and distribution parameters are iteratively computed until the model converges. In each EM iteration, Bayesian Information Criterion (BIC) or the Akaike Information Criterion (AIC) is computed. The GMM object that optimizes either of the BIC or the AIC allows the analysis method to determine the optimal number of mixture components, n.

With GMM objects as inputs, which may essentially be distributions, the appropriate distance measurement techniques may also be defined for two distributions. To determine the health confidence value (CV), which is a comparison (i.e., a distance) between the recent behavior distribution with a known normal behavior distribution, L2 distance may be employed. The degree of similarity or the overlap between two Gaussian mixtures may be numerically obtained using L2 distance. The computed value is normalized between 0 and 1, where the lower CV represents a larger distance between the two distributions and lower health status, or a degraded equipment performance condition.

In yet another model, an Artificial Neural Network, also called parallel distribution processing systems, may be used. Neural networks consist of simple neurons arranged in a structured and systematic manner. Each neuron is a processing unit that weights its inputs, sums the weighted inputs, adds a bias to the calculation, and processes the input in a transfer function. A neural network may consist of several neurons in one or more layers. A neural network can also be configured to me multi-input and/or multi-output.

In a network structure, the weight matrix constructs a relationship between the input and output vectors. The process of finding the optimum values for the weight matrix is called the training phase, where the error function is minimized. Updating the weight values are based on the network feedback, i.e., the difference between the target and the network output. Among several network designs, the feed-forward back-propagation neural network may be suited for this application. For example, a network having two layers where the first layer has $N_1$ neurons and the second layer has $N_2$ neurons, the weight matrix may be set up as an $N_1 \times N_2$ matrix. The weight value for the ith input of the jth neuron may then be updated according to:

$$\Delta w_{ij}(n) = \eta \left( \frac{\partial E(n)}{\partial w_{ij}} \right) + \alpha \Delta w_{ij}(n-1)$$

where E(n) is the difference between the target and the network output for the nth input, $\eta$ is the learning rate, which controls the amount of change in the weights in each epoch, and $\alpha$ is called the momentum constant, which may be set to avoid being trapped in local minima.

After successfully training the neural network with good condition data from the wind turbines 210, degradation assessment may then be implemented by comparing the computed output with the actual measured equipment output. The difference between the two may be referred to as a "residue." In theory, if the equipment being monitor is in a state of acceptable normal condition, the residual values should be small, approaching 0. If the equipment performance begins to degrade, the residues may increase in magnitude. This is an indirect technique demonstrating how neural networks may be used in fault detection or health assessment if actual failure modes cannot be directly modeled due to a lack of data during the conditions.

A method may be used to minimize erratic results due to only a localized portion of the regime support being affected by degradation. Instead of computing the health value for each sample, the data is segmented to an acceptable, discrete time period, the duration of which depends on the frequency with which the performance assessment results are to be evaluated. For each segment, the residues r are computed using a traditional approach, but the $CV_k$ is computed according to the following equation:

$$CV_k = \frac{\text{\# of } r \geq r_{thres}}{\text{\# of samples in } k^{th} \text{ segment}}$$

where $r_{thres}$ is a constant determined empirically and k is the segment index.

The degradation of a wind turbine 210 and its components are indicated by the excess of certain features or combination of features over a prescribed threshold. Features may be extracted from sensor measurement and control signal. For example, the change of a power output profile over a wind speed spectrum may indicate the power generation capability degradation of a wind turbine 210 as a whole. Additionally, the increase of vibration level or temperature reading for a component, for example the gearbox 218 or the hub support bearings 217, may imply that the component may be developing a mechanical defect.

One embodiment of the method of predicting an end of life of a wind turbine component is presented below. As discussed above, distributing wind turbines 210 within a wind turbine farm 200 into peer-clusters 212 allows analysis of wind turbines 210 operating under similar environmental conditions. Consider a wind turbine farm 200 $R=[r_1, r_2, \ldots, r_Y]$ where the wind turbine farm 200 includes Y number of wind turbines 210. Each wind turbine 210 in the wind turbine farm 200 has three attached vectors:

$$O(r_i)=[g_{1,i},g_{2,i},\ldots,g_{v,i}]$$

$$W(r_i)=[h_{1,i},h_{2,i},\ldots,h_{q,i}]$$

$$F(r_i)=[x_{1,i},x_{2,i},\ldots,x_{n,i}]$$

where $O(r_i)$ is the v-dimensional vector associated with the performance variable of the wind turbines 210; $W(r_i)$ is the q-dimensional vector associated with the different environmental conditions of the wind turbines 210; and $F(r_i)$ is the n-dimensional vector consisting of the features of the wind turbines 210 that are indicative of component performance degradation.

Because the component performance metrics vary as the environmental conditions in which the wind turbines 210 operate change, the environmental condition parameters described by $W(r_i)$ may be partitioned. For situations where the environmental conditions are acceptably discrete and the number of operating conditions is known, clustering techniques such as k-means may be used. Peer-clusters 212 may be formed by comparing the environmental condition described by $W(r_i)$ for one of the wind turbines 210 to all of the peer wind turbines 210. A multivariate hypothesis testing process may be employed. This process is repeated until such time that all Y units belong to a cluster. Therefore the result of distributing wind turbines 210 into peer clusters is the structure $C=[c_1, c_2, \ldots, c_z]$ consisting of z clusters where each cluster $c_f=\{r_{h,f}|h=1, 2, \ldots, p_f \in R\}$ and $p_f$ is the number of wind turbines 210 in the peer-cluster 212. Note that $$\sum_{f=1}^{z} p_f = Y.$$

It is expected that $p_f>1$ for all z clusters.

After aggregating wind turbines 210 into peer-clusters 212, the highest performing wind turbines 210 within a peer-cluster 212 are selected for establishing a baseline to which other wind turbines 210 within the peer-cluster 212 may be compared. In one example, the performance variable of a given wind turbine 210 given in $O(r_i)$ may represent the difference between actual power produced by the wind turbine 210 and the realistic power expectation based on the environmental conditions. For such an example, the highest performing wind turbine 210 has the smallest performance variable stored in $O(r_i)$. Therefore, the highest performing wind turbine 210 in each peer-cluster $c_f$ will be identifiable, and is denoted as $r_{h^*,f}$. Within each peer-cluster $c_f$, the highest performance wind turbine 210 may be compared to other wind turbines 210 using a distance measure $D_{h,f}$. A normalized L2 distance metric may be used to bound ($D_{h,f} \in \{0,1\}$):

$$D_{h,f} = \text{distance}(O(r_{h^*,f}), O(r_{h,f})) = \frac{\|O(r_{h^*,f}) \cdot O(r_{h,f})\|_{L2}}{\|O(r_{h^*,f})\|_{L2} \|O(r_{h,f})\|_{L2}}$$

for $h = 1, \ldots, p_f$

Therefore, after evaluating the threshold T beyond which the actual power produced by a wind turbine 210 is causes the wind turbine 210 to be identified as a lower performing wind turbine 210, values greater than T can be set aside as weights $\omega_f$:

$$\omega_f = \{D_{c,f} | c=1, \ldots, h_f\}$$

Thus, each peer-cluster $c_f$ has a small subgroup of higher performing wind turbines 210 that may be used to create the peer-cluster baseline:

$$c_{f,bl} = \{r_{c,f} | c=1, \ldots, h_f; r_{c,f} \in c_f; h_f < p_f\}.$$

Dynamic environmental conditions prevent the use of pre-constructed performance degradation assessment models. Thus, use of local modeling, known as lazy or just-in-time learning, to utilize the most recent data provided by the SCADA 300 to create a degradation assessment model. Each peer-cluster $c_f$ constructs its own model $M_{f,tr}$, which are a collection of individual models based on each peer-cluster baseline unit in $c_{f,bl}$, as identified above. The peer-cluster modules use features for training the vector indicative of performance degradation, $F(c_{f,bl})$. The health value of each peer wind turbine 210, $CV_{h,f}$ is then computed by using a locally weighted averaging method using the similarity weights, $\omega_f$, that were discussed above:

$$CV_{h,f} = \frac{\sum_{c=1}^{h_f} D_{c,f} CV_{h-c,f}}{\sum_{c=1}^{h_f} D_{c,f}} \quad \text{for } h = 1, \ldots, p_f$$

where $CV_{h-c,f}$ is the health value of each peer wind turbine 210 computed by comparing the component performance metric with each baseline peer, $r_{c,f}$, in the subgroup $c_{f,bl}$:

$$CV_{h-c,f} = \text{distance}(F(r_{c,f}), F(r_{h,f})) \text{ for } c=1, \ldots, h_f$$

The disclosed method aims to address wind turbine 210 condition monitoring when there are multiple environmental conditions. Thus, a multiple modeling approach may be used to decompose the component performance metric distribution into a mixture of Gaussians. Each peer-cluster $c_f$, therefore, is represented by a model $M_{f,tr}$, which can be derived by:

$$M_{f,tr}(F(c_{f,bl})) = M_{f,tr-c}(x)$$

$$= \sum_{i=1}^{\alpha} q_{i-c} h(x; \theta_{i-c})$$

for $c = 1, \ldots, h_f$ where $q_{i-c}$ represents the class weights of the training set for each baseline peer, $\alpha$ represents the number of working regimes for that baseline peer, and the expression $h(x; \theta_{i-c})$ is a component probability distribution. Each wind turbine 210 within the peer-cluster will undergo the same density estimation process. The model testing $M_{f,ts-h}$ may be generated for each $r_{h,f}$ in each cluster $c_f$.

$$M_{f,ts-h}(F(r_{h,f})) = M_{f,ts-h}(x)$$
$$= \sum_{j=1}^{\alpha} s_j h(x; \vartheta_j).$$

Finally, the health, $CV_{h,f}$, may be estimated for each wind turbine 210 within the peer cluster by using a similar locally weighted averaging method that applies the similarity weight, $\theta_f$, to individually computed health values when each baseline wind turbine 210 is compared to a peer wind turbine 210 using L2 distance between the mixtures $M_{f,tr-c}$ and $M_{f,ts-h}$:

$$CV_{h,f} = \frac{\sum_{c=1}^{h_f} D_{c,f} \frac{\|M_{f,tr-c} \cdot M_{f,ts-h}\|_{L2}}{\|M_{f,tr-c}\|_{L2} \|M_{f,ts-h}\|_{L2}}}{\sum_{c=1}^{h_f} D_{c,f}} \text{ for } h = 1, \ldots, p_f$$

where:

$$\|M_{f,tr-c} \cdot M_{f,ts-h}\|_{L2} = \sum_{i=1}^{\alpha} \sum_{j=1}^{\alpha} q_{i-c} s_j \|h(x; \theta_{i-c}) h(x; \vartheta_j)\|$$

It should now be understood that turbine-to-turbine prognostics techniques as described hereinabove may allow for monitoring the performance and health of a wind turbine using data readily available from SCADAs that are on-board the wind turbines. The systems and methods described herein allow for wind turbines operating at similar environmental conditions at a wind farm to be compared with one another to determine if and when any of the wind turbines require maintenance. The improved ability to monitor performance of the wind turbines may decrease downtime, may target preventative maintenance to those wind turbines requiring repair, and may reduce the need for unnecessary repairs.

Having described the disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

What is claimed is:

1. A method for predicting an end of life of a wind turbine component wherein a computer processor executes a computer program encoded in a non-transitory computer readable medium containing instructions there for causing the computer processor to perform an operation of transforming electronic data into a prognostic evaluation, the method comprising:

receiving environmental conditions indicative of natural surroundings of wind turbines within a wind turbine farm from environmental sensors;

receiving component performance metrics indicative of an operation of wind turbines within a wind turbine farm from performance sensors;

distributing the wind turbines into peer-clusters having less than a total number of wind turbines within the wind turbine farm such that the wind turbines within each of the peer-clusters have similar environmental conditions;

identifying a highest performing wind turbine, a low performing wind turbine, and a subgroup of higher performing wind turbines within one of the peer-clusters based upon a predicted performance model;

the computer processor processing the component performance metrics of the low performing wind turbine and the subgroup of higher performing wind turbines in the peer-cluster to extract fault condition indicators that correlate the component performance metrics to failure modes;

identifying a critical component of the low performing wind turbine by contrasting the fault condition indicators of the low performing wind turbine with the subgroup of higher performing wind turbines in the peer-cluster; and predicting the end of life of the critical component of the low performing wind turbine based upon the component performance metrics of the subgroup of higher performing wind turbine in the peer-cluster.

2. The method of claim 1 further comprising building a health assessment model of the critical component, wherein the health assessment model is built with the component performance metrics of the subgroup of higher performing wind turbines.

3. The method of claim 2, wherein the health assessment model comprises a logistic regression, a statistical pattern recognition, a feature map pattern matching, a neural network, a Gaussian mixture model, a support vector machine, a Bayesian belief network, a hidden Markov model, a self organizing map, or a combination thereof.

4. The method of claim 1 further comprising receiving performance metrics indicative of performance of the wind turbines, wherein the highest performing wind turbine, the low performing wind turbine, and the subgroup of higher performing wind turbines are identified by evaluating the performance metrics of the wind turbines in the peer-clusters against the predicted performance model.

5. The method of claim 1, wherein the performance metrics comprise a comparison of power generation and wind speed.

6. The method of claim 1 further comprising applying a distance measurement technique to determine a probability of defect.

7. The method of claim 1 further comprising scheduling a maintenance procedure comprising taking the wind turbine off line from generating power when a predicted cost of not performing the maintenance procedure is greater than the predicted cost of performing the maintenance procedure.

8. The method of claim 1, wherein the end of life is predicted by an autoregressive moving average, a recurrent neural network, a fuzzy logic, a match matrix, or a combination thereof.

9. The method of claim 1, wherein the environmental conditions comprise wind speed, wind direction, temperature, barometric pressure, humidity, or a combination thereof.

10. The method of claim 1, wherein the wind turbines comprise a bearing, a blade, and a generator.

11. The method of claim 10, wherein the component performance metrics are correlated to the bearing.

12. The method of claim 10, wherein the component performance metrics are correlated to a pitch of the blade.

13. The method of claim 10, wherein the component performance metrics are correlated to a yaw of the blade.

14. The method of claim 10, wherein the component performance metrics are correlated to a power output by the generator.

15. A system for predicting an end of life of a wind turbine component, the system comprising:

a computer processor for executing machine readable instructions electronically coupled to a non-transitory computer readable medium encoded with a computer program containing machine readable instructions stored therein for causing the computer processor to perform the machine readable instructions;

a wind turbine farm comprising wind turbines for generating energy from wind;

environmental sensors located proximate to each of the wind turbines for detecting environmental conditions surrounding the wind turbines; and performance sensors located proximate to each of the wind turbines for detecting performance metrics correlated with the wind turbines;

wherein the computer processor is supplied with data from the environmental sensors and the performance sensors and executes the machine readable instructions of the computer program to:

distribute the wind turbines into peer-clusters according to similarities in the environmental conditions, where the peer-clusters have less than a total number of wind turbines within the wind turbine farm;

identify a highest performing wind turbine, a low performing wind turbine, and a subgroup of higher performing wind turbines within one of the peer-clusters based upon the performance metrics;

process the component performance metrics of the low performing wind turbine and the subgroup of higher performing wind turbines in the peer-cluster to extract fault condition indicators that correlate the component performance metrics to failure modes;

identify a critical component of the low performing wind turbine by contrasting the fault condition indicators of the low performing wind turbine with the subgroup of higher performing wind turbines in the peer-cluster; and predict the end of life of the critical component of the low performing wind turbine based upon the component performance metrics of the subgroup of higher performing wind turbines in the peer-cluster.

16. The system of claim 15, wherein the environmental conditions and/or the performance metrics are processed by a time domain analysis, a frequency domain analysis, a time-frequency analysis, a wavelet/wavelet packet analysis, a principal component analysis, or a combination thereof.

17. The system of claim 15, wherein the component sensors are an accelerometer, a thermocouple, a tachometer, an oil pressure sensor, or an oil temperature sensor.

18. A wind turbine farm that predicts an end of life of a wind turbine component comprising:

a plurality of wind turbines, each wind turbine comprising a generator coupled to a blade by a gearbox for generating energy from wind;

environmental sensors located proximate to each of the wind turbines for detecting environmental conditions surrounding the wind turbines;

performance sensors located proximate to each of the wind turbines for detecting performance metrics correlated with the wind turbines;

gearbox sensors located proximate to each of the gearboxes for detecting gearbox performance metrics correlated with the wind turbines; and a computer processor for executing machine readable instructions in a non-transitory computer readable medium for causing the computer processor to perform the machine readable instruction, wherein the processor is supplied with data from the environmental sensors, the performance sensors, and the gearbox sensors and executes the machine readable instructions to:

distribute the wind turbines into peer-cluster according to similarities in the environmental conditions, where the peer-clusters have less than a total number of wind turbines within the wind turbine farm;

identify a highest performing wind turbine, a low performing wind turbine, and a subgroup of higher performing wind turbines within one of the peer-clusters based upon the performance metrics; and predict an end of life of the gearbox from the low performing wind turbine according to differences in the gearbox performance metrics between the low performing wind turbine and the subgroup of higher performing wind turbines.

19. The wind turbine farm of claim 18 further comprising processing the gearbox performance metrics to extract fault condition indicators that correlate the gearbox performance metrics to failure modes.

20. The wind turbine farm of claim 19, wherein the failure modes are gear tooth breakage, hub rotating imbalance, bent shaft, bearing race defect, or bent key.

* * * * *